US008720657B2

(12) United States Patent
Kramer et al.

(10) Patent No.: US 8,720,657 B2
(45) Date of Patent: May 13, 2014

(54) REWINDABLE ELECTRICAL CABLE EXTENSION DEVICE

(75) Inventors: Joseph Kramer, Mevasseret Zion (IL); Felix Roif, Modi'in (IL)

(73) Assignee: Kramer Electronics, Ltd., Jerusalem (IL)

( * ) Notice: Subject to any disclaimer, the term of this patent is extended or adjusted under 35 U.S.C. 154(b) by 222 days.

(21) Appl. No.: 13/459,990

(22) Filed: Apr. 30, 2012

(65) Prior Publication Data

US 2012/0312651 A1 Dec. 13, 2012

(51) Int. Cl.
*H02G 11/02* (2006.01)
*B65H 75/44* (2006.01)

(52) U.S. Cl.
CPC .......... *H02G 11/02* (2013.01); *B65H 75/4434* (2013.01); *B65H 75/4449* (2013.01)
USPC .................................................. 191/12.2 R

(58) Field of Classification Search
CPC .......... B65H 75/4449; B65H 75/4452; B65H 75/48; B65H 75/4418; B65H 75/4428; H02G 11/02
USPC ...... 191/12 R, 12.2 R; 242/378.2, 378, 378.1
See application file for complete search history.

(56) References Cited

U.S. PATENT DOCUMENTS

| | | | |
|---|---|---|---|
| 6,328,243 B1 * | 12/2001 | Yamamoto | 242/378.1 |
| 6,416,005 B1 | 7/2002 | Liao | |
| 6,497,378 B1 | 12/2002 | Liao | |
| 6,616,080 B1 | 9/2003 | Edwards | |

FOREIGN PATENT DOCUMENTS

DE          100 20 013    *   8/2001
DE     20-2007-006899 U1    10/2007

OTHER PUBLICATIONS

Jun. 12, 2013 PCT Notification of Transmittal of the International Search Report and the Written Opinion of the International Searching Authority—as to PCT/IL2012/000165 (filing date Apr. 17, 2012).

* cited by examiner

*Primary Examiner* — Mark Le
(74) *Attorney, Agent, or Firm* — Haynes & Boone, LLP; William B. Nash; Joseph Mencher

(57) ABSTRACT

A rewindable electrical cable extension device includes a housing having first and second exit ports, and a cable having first and second ends defining opposing extremities of first and second contiguous cable sections having a common junction anchored to a rotating spool. The first end protrudes through the first exit port, and the second end is fixedly mounted in association with the second exit port. The first cable section is wound on a spool that is configured to rotate within the housing. The second cable section is wound in an opposite direction to the first section so that pulling on the first end unwinds and extracts the first cable section from the housing and uncoils the second cable section within the housing without rotating the second end of the cable.

30 Claims, 11 Drawing Sheets

REWINDABLE ELECTRICAL CABLE EXTENSION DEVICE

FIELD OF THE INVENTION

The present invention relates to retractable cord assemblies for use with electrical or electronic devices.

BACKGROUND OF THE INVENTION

Cord reels are used to retract and dispense cables for electrical devices such as telephones. Within the context of the invention, the cables may be power cables such as extension cables that are used to connect portable electrical appliances to a source of electricity that is remote from the appliance. Alternatively, the cables may be signal cables allowing signals from an electrical appliance to be fed to a desired target. Cord reels of one form or another are well known.

U.S. Pat. No. 6,495,756 discloses a retractable cord assembly comprises a cable having a central carrier and plural conductors helically wrapped about the central carrier.

U.S. Pat. No. 5,535,960 discloses a cord reel assembly for maintaining a length of stationary wire and a length of shielded retractable wire around a spool and dispenses a retractable wire as an attached handset is extended away from assembly, while the stationary wire is concurrently being wound.

WO 2010/146363 discloses a mobile mains-powered appliance i.e. canister-type vacuum cleaner, wherein an electric power cable is wound around rotatable reel, and a socket connector is arranged on an end of the cable.

US 2010/0270413 discloses a rotation-type, single-pull retraction mechanism for e.g. power cable, having a wire material reeled on a wire winding annular wall, where two ends of the wire material pass through two wire-outlet holes.

US 2011/006198 discloses a cable dispensing system for recharging batteries of an electric vehicle, having insulating discs and coils arranged within a housing.

U.S. Pat. No. 6,722,602 discloses a cable management system and method for winding on or letting out a length of cable from a cable support apparatus, in a generally curved, figure eight path, while preventing continuous twisting of a fixed length of cable coupled between the cable support apparatus and a fixed device. The cable support apparatus includes a pair of spools which are arranged at a 45° angle to one another. Cable is alternately wound onto or wound from the two spools as the apparatus is moved in the figure eight path.

U.S. Pat. No. 7,201,342 discloses a signal cable rewinder having two opposing housings in which two independently rewinding discs are disposed. Each of two signal cables is folded once in the middle thereof to form a double-folded member that is wound around the rewinding disc. Both ends of the first signal cable are extended out of the openings of the housings, respectively thus providing two independently retractable and extendable signal cables in a single housing.

One problem which is common to known devices will now be explained with reference to a power extension cable device having a cable wound round a reel in which there is fixed a power socket to which one end of the cable is coupled. A plug is connected to the other end of the cable, thus allowing an electrical appliance such as a power drill to be plugged into the extension cable device, while connecting the plug to a wall socket remote from the appliance thus allowing use of the appliance at a location that is too far from the wall socket for the appliance cable to reach on its own. In such a device, once the appliance is connected to the socket in the extension device, retracting the cable therefrom causes rotation of the socket and with it the cable attached to the appliance. This twists the appliance cable and may cause damage.

The risk of damage is all the more acute when signal cables are extended in a similar manner, since signal cables are very much narrower in diameter than electrical power cables and have multiple cores inside the cable. One common application for retractable cord assemblies for use with signal cables relates to the need to connect portable devices, such as a laptop, to a fixed infrastructure for feeding signals from the portable device to a remote and inaccessible fixture such as a Barco™ projector attached to the ceiling. In this case, a cable from the Barco™ projector is commonly routed to a socket in the floor or to a cable that is accessible from the floor or the like. A signal cable may then be connected from the laptop to the Barco™ extension socket. However, running loose cables along the floor is untidy and so it is becoming increasingly popular to route such cables to a central hub often fixed in the center of a table in a conference room allowing a signal cable to be coupled from the central hub to the laptop.

The present invention is concerned with an improvement to such devices where the need to provide an external signal cable is altogether obviated by providing a retractable signal cable as part of the hub. In this case, it must be withdrawn in order to reach a laptop or other portable device that is typically placed on the conference table and to which the cable in the hub is then coupled. After use, the cable is disconnected from the laptop (or other portable device) and it typically is retracted under spring action back into the hub. Since the hub is a fixed structure, extracting the cable commonly subjects it to twisting as explained above.

SUMMARY OF THE INVENTION

It is therefore an object of the invention to provide a cable reel connector, where such twisting is avoided.

This object is realized in accordance with the invention by a rewindable electrical cable extension device for coupling between first and second connectors, the device comprising:

a housing having first and second cable exit ports, a cable having a first end and a second end defining opposing extremities of first and second contiguous sections of the cable, the first end of the cable protruding through the first exit port and being configured for connection to the first connector, the second end of the cable being fixedly mounted in association with the second exit port and being configured for connection to the second connector, and the first section of the cable being wound in a first direction on a rotating spool that is configured to rotate within the housing, a common junction of the first and second sections of the cable being anchored to the rotating spool, and the second section of the cable being wound in an opposite direction to the first section so that unwinding the cable by pulling on the first end extracts the first section of the cable from the housing and uncoils the second section within the housing without rotating the second end of the cable.

In some embodiments, the second section of the cable is wound on a non-rotating element.

Pulling on the first end of the cable unwinds the first section thereby rotating the common junction between the first and second sections of the cable. Since the second section of the cable is wound in the opposite direction to the first section, this rotates the outer end only of the second section in a direction that uncoils it without applying force to the opposite end of the second section. Consequently, the second end of the cable is to all intents and purposes anchored relative to the housing so that even if it is connected to a remote fixture, extending the first section induces no twisting in the second section.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
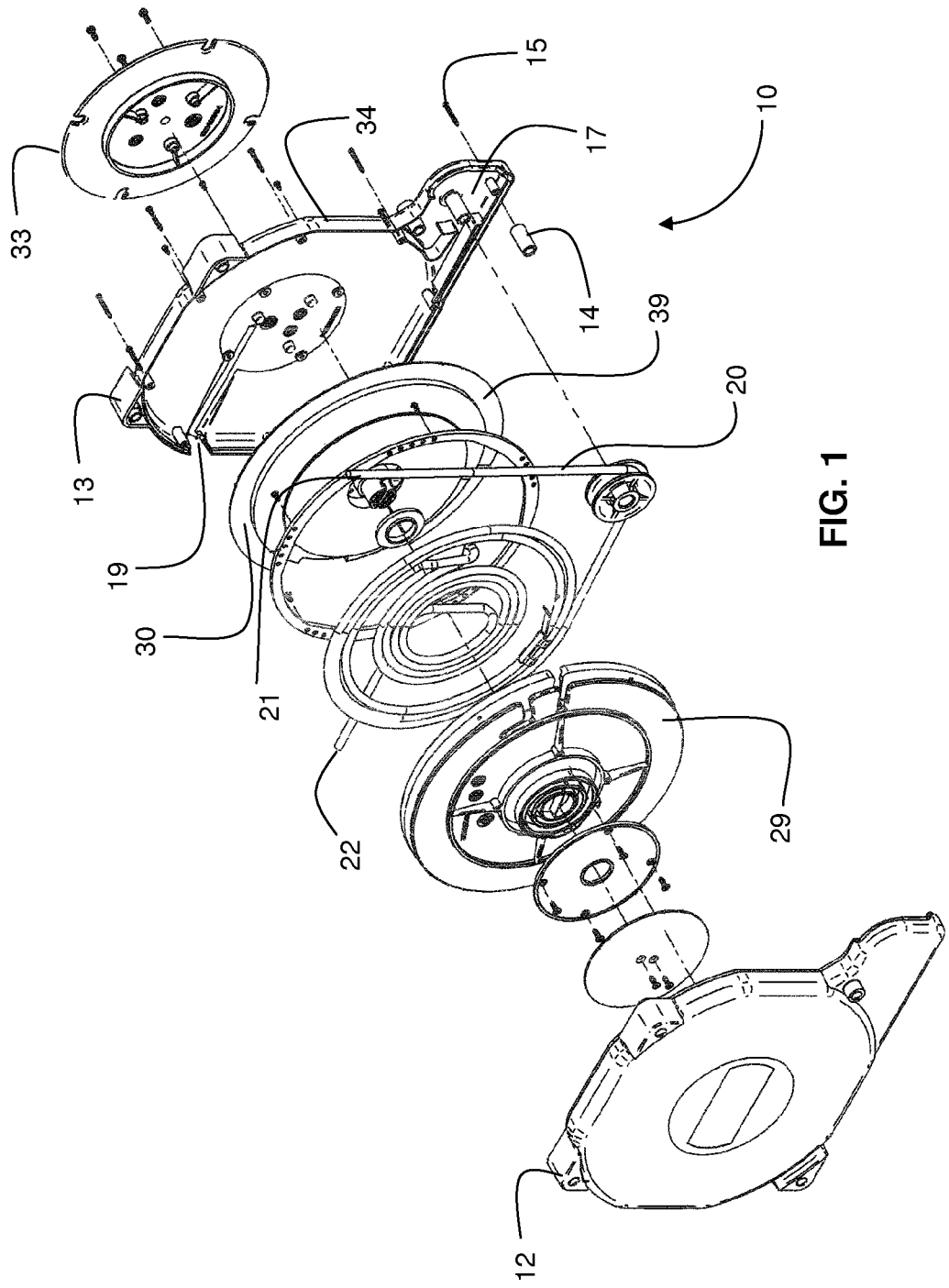
FIG. 1 is an exploded pictorial representation of a rewindable electrical cable extension device according to the invention.

Referring to the figures, there is shown a rewindable electrical cable extension device 10 for coupling between first and second connectors (not shown). The device 10 comprises a housing 11 (see FIG. 12) formed from a split casing having a base section 12 and a cover 13 that are separated via spacer rings 14 and secured by screws 15. First and second cable exit ports 17 and 19, respectively, are formed in the housing for conveying therethrough a cable 20 having a first end 21 and a second end 22 defining opposing extremities of a mutually contiguous first section 23 and second section 24 having a common junction 25 intermediate thereof that is anchored in the housing 11 and therefore incapable of movement relative thereto.

The first end 21 of the cable 20 protrudes through the first exit port 17 and is configured for connection to the first connector. To this end, it is typically provided with an integral plug or socket for coupling to a complementary connector. However, depending on the use of the device, it may be assembled or sold without the first connector, which may be fitted by an end-user prior to use. Likewise, the second end 22 of the cable 20 protrudes through the second exit port 19 and is configured for connection to the second connector. Here also, the second end 22 is typically provided with an integral plug or socket for coupling to a complementary connector although the second connector may also be fitted by an end-user prior to use. However, since in normal use, the second end 22 of the cable is normally connected to a remote fixture that is in close proximity to the device 10, the second connector may in some applications be a socket fixed to the housing allowing the remote fixture to be coupled via a short length of cable having a suitable plug at its end. It will be understood that also in this case the second exit port 19 is required to allow the cable 20 to protrude therethrough for connection to a socket mounted on the exterior of the housing and covering the second exit port 19. Connection between the remote fixture and the second end of the cable may be effected prior to withdrawal of the first end of the cable from the housing. In any event, for reasons that will subsequently become clear, withdrawal from the housing of the first end of the cable does not rotate the second section of the cable and so does not induce twisting therein.

To this end, the first section 23 of the cable 20 is wound in a first direction (e.g. clockwise) while the second section 24 of the cable is wound in the opposite direction (e.g. anti-clockwise) so that unwinding the cable by pulling on the first end 21 extracts only the first section 23 of the cable from the housing without rotating the second end 22 of the cable.

Figure 7A:
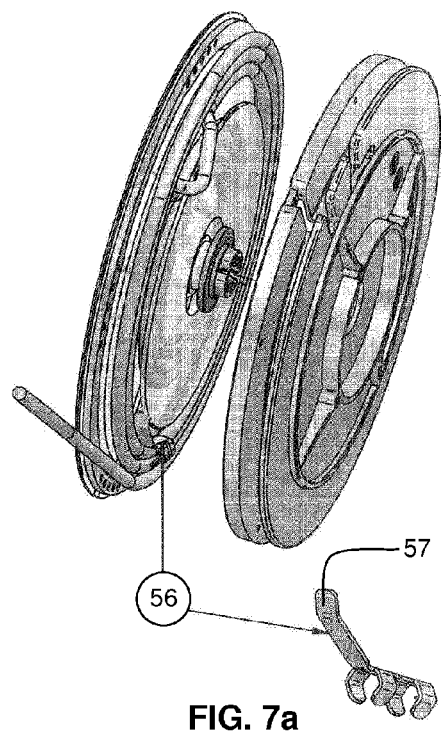

In more detail, it is seen in the figures that the first section 23 of the cable 20 is wound on a rotating spool 29 and the second section 24 is wound on a non-rotating spool 30 having a central cylindrical hub 31 which serves as a spindle for the rotating spool 29. The cable 20 passes through a peripheral slot 32 in the non-rotating spool 30, which separates the first and second sections of the cable and serves to anchor the common junction 25 of the cable between the first and second sections to the rotating spool 29. The common junction 25 may be anchored to the rotating spool 29 by a pair of openings in the housing allowing the cable to exit the rotating spool 29 and pass via the exterior of the housing to the non-rotating spool 30 as shown in FIG. 7a. In some applications the length of the second section of the cable may be cut to order so that there is just sufficient length to effect a secure connection to the remote fixture. More generally, the second section 24 includes a sufficient amount of cable to connect to the remote fixture without the need for extension leads. To avoid surplus cable trailing over the floor, a take-up spool 33 is mounted on an exterior surface 34 of the housing 11 for taking up any excess of the second section 24 of the cable protruding through the second exit port.

Figures 2A, 2B:
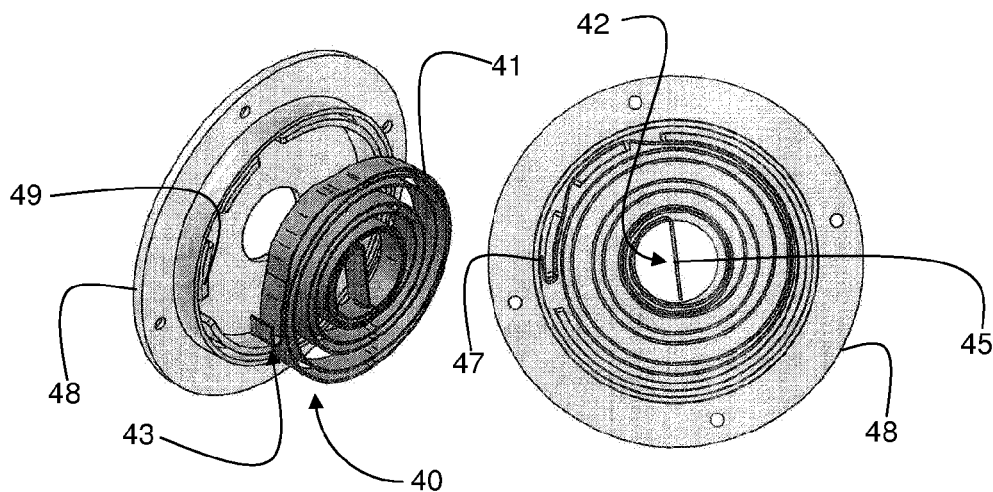
FIGS. 2a to 12 are pictorial representations showing successive stages in the assembly of the cable extension device.
Figure 2C:
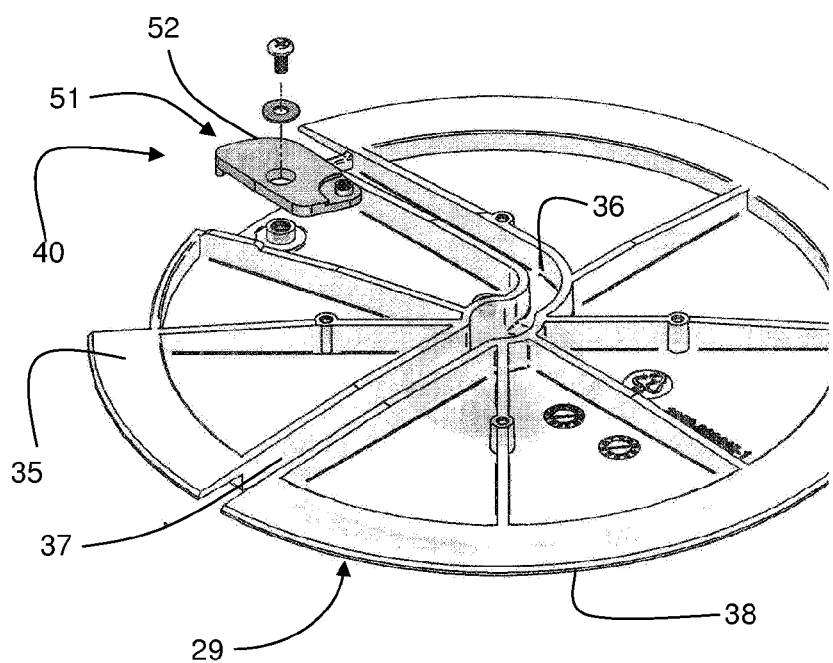

As seen in FIG. 2c, the rotating spool 29 comprises a first surface 35 having a radial channel 36 for accommodating the cable therein and an opening 37 abutting the radial channel for allowing the cable to be folded through the opening to a second surface 38 of the first spool. The first section of the cable is wound on a bobbin formed by the second surface of the first spool and a concentric circular disc 39.

Figure 5:
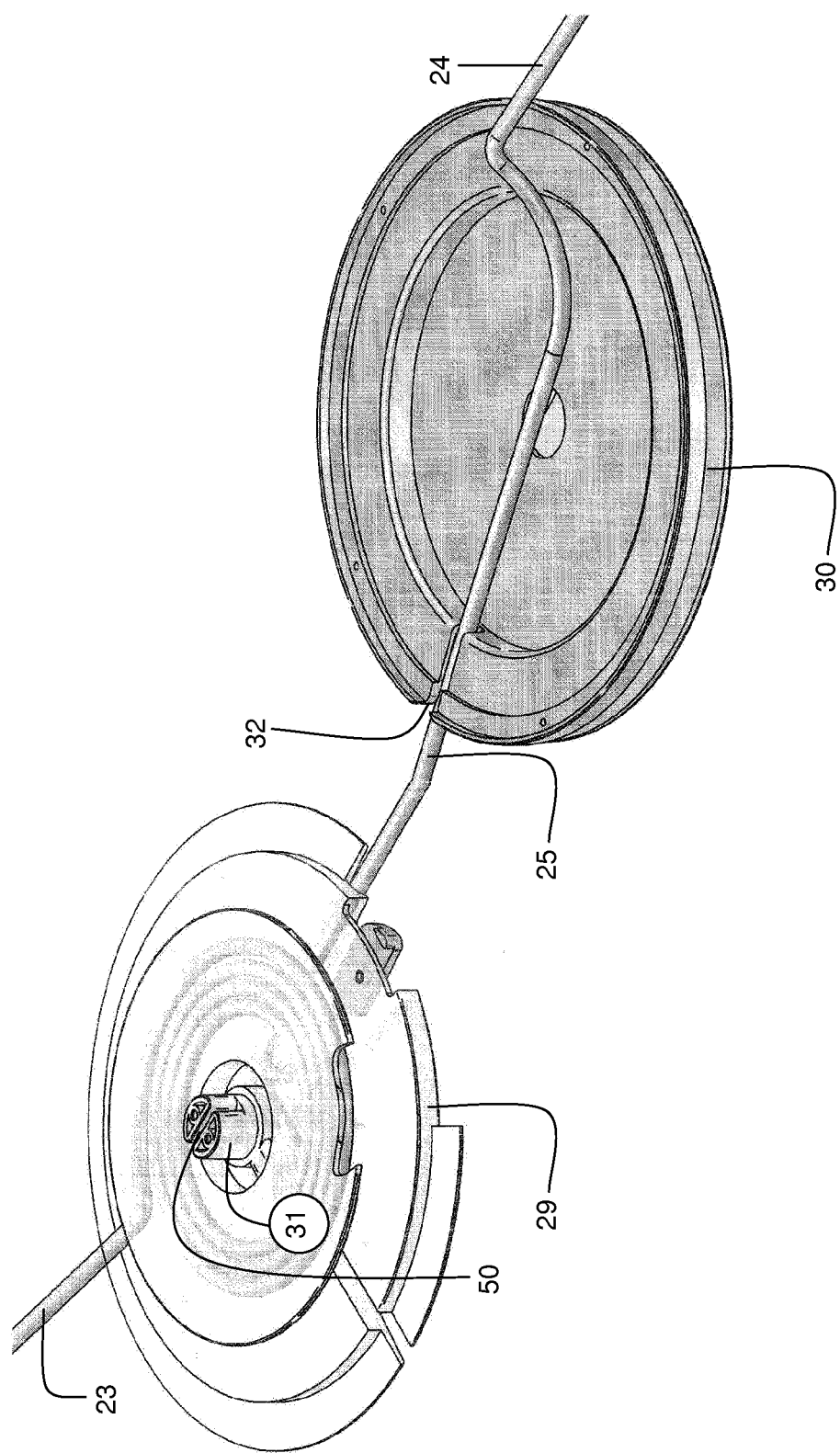
Figure 8A:
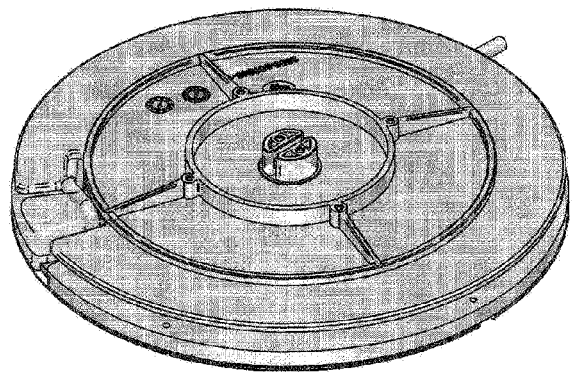
Figure 8B:
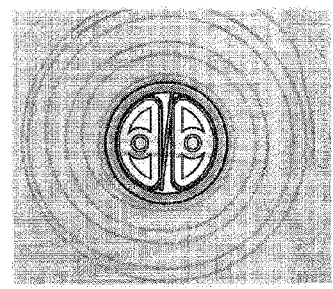
Figure 8C:
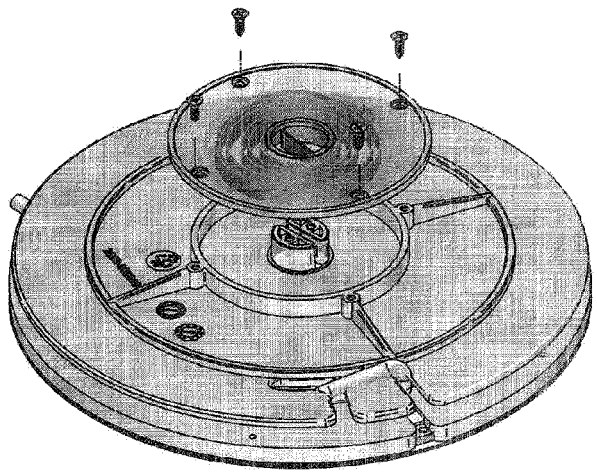

As shown in FIGS. 2a, 2b, 2c and 8c a spring-loaded clutch 40 is provided for rewinding the first section of the cable 20 on to the rotating spool 29. The clutch 40 clutch includes a coil spring 41 mounted within the rotating spool 29 and having a first end 42 anchored to the rotating spool 29. A second end 43 of the coil spring 41 is fixedly anchored relative to the housing and the coil spring is wound so that when the rotating spool is unwound the coil spring is wound. The first end 42 of the coil spring is of the form of a straight section 45 around which the spring is wound, the second opposite end 43 being folded to form a lip 47. FIG. 2a shows a first step during the assembly of the device where the coil spring 41 is inserted into a molded cylindrical cap 48 having a support 49 for engaging the lip 47. After the cable 20 has been assembled within the housing, the assembled coil spring 41 is then mounted on to the exterior of the housing, whereby the straight section 45 is accommodated within a slot 50 (shown in FIG. 5a) formed in the hub 31 of the non-rotating spool 30 as shown in FIG. 8c.

The clutch 40 further comprises a resilient armature 51 pivotally mounted on the rotating spool 29 having a contoured outer edge 52 for engaging a contoured inner surface 53 of an annular rim 54 (shown in FIG. 6) fixed to the non-rotating spool 30 thereby preventing rotation of the rotating spool 29. The armature 51 is resiliently biased by a spring 55 so that when the first section 23 of the cable is pulled, the edge 52 of the armature 51 is released from the annular rim 54, thereby allowing unimpeded rotation of the rotating spool 29 for rotating the rotating spool in a direction that unwinds the coil spring 41 and retracts the cable 20 back into the housing.

A limiter device 56 shown in FIG. 7a may be operatively connected to the first section 23 of the cable for limiting the extent to which the first section of the cable can be withdrawn from the housing. In some embodiments, the limiter device 56 comprises an armature 57 crimped to the first section 23 of the cable proximate the common junction 25 between the first and second sections and configured to engage an internal surface of the housing and prevent further withdrawal of the cable.

Figure 3:
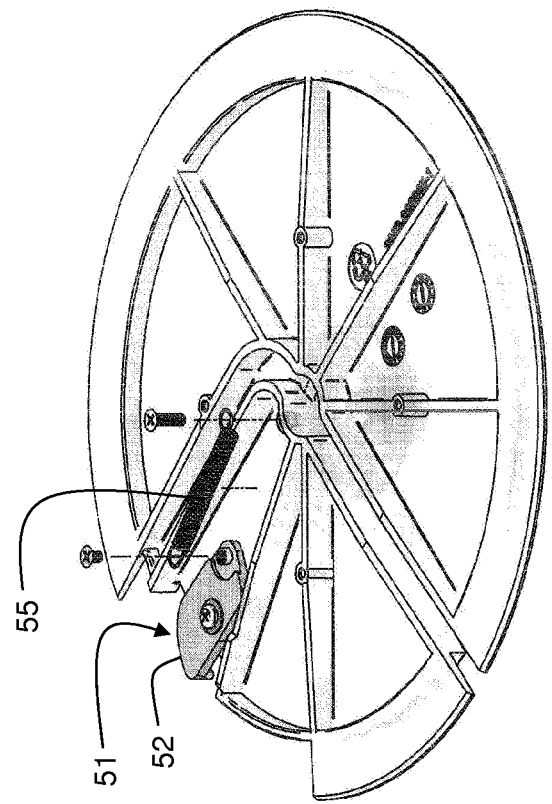
Figure 4:
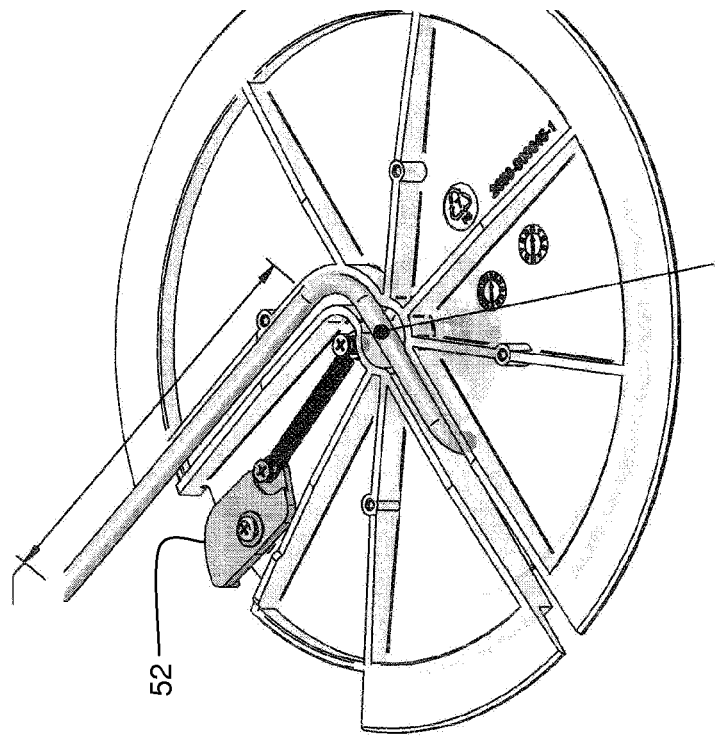
Figure 6:
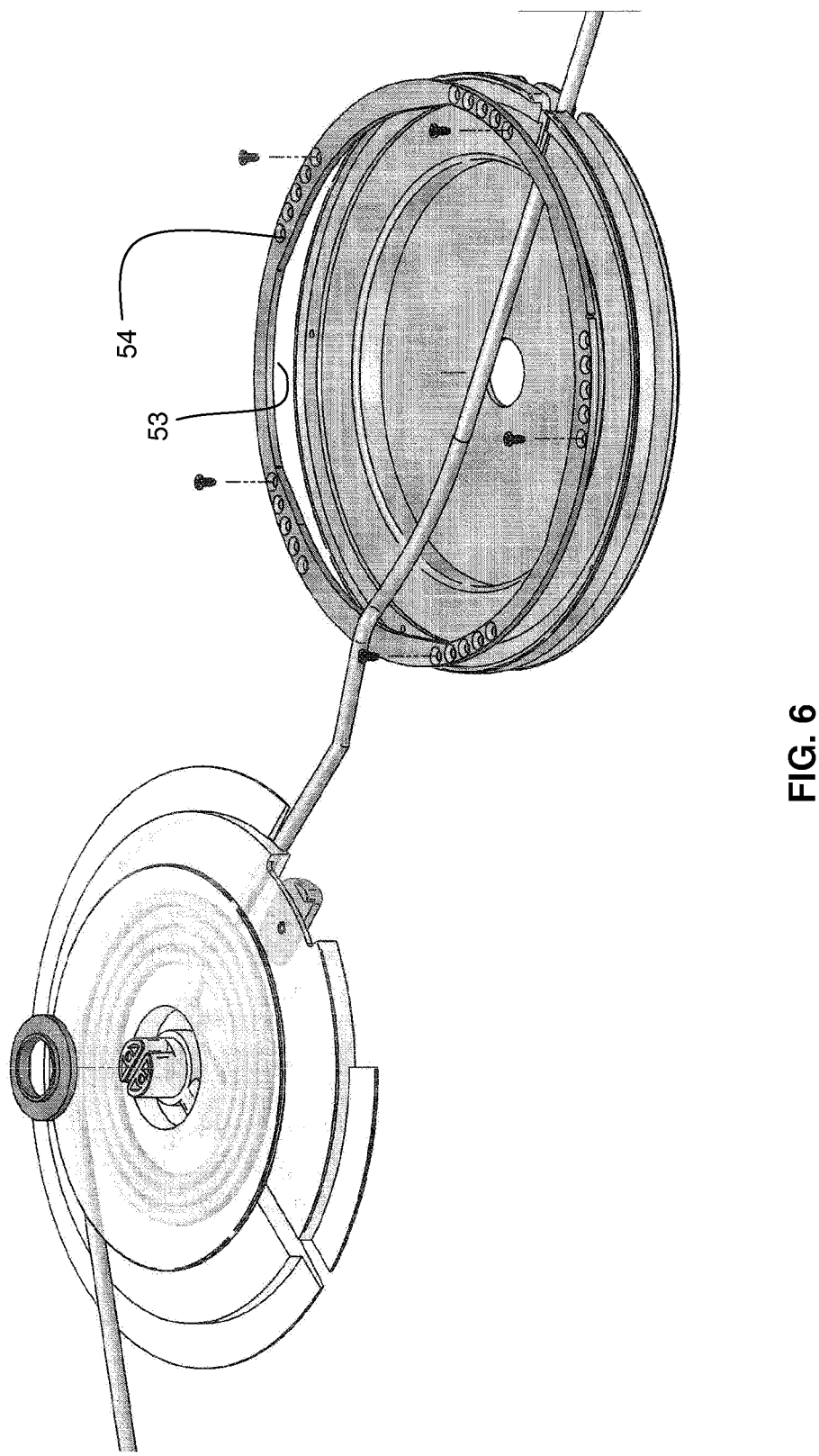
Figure 7B:
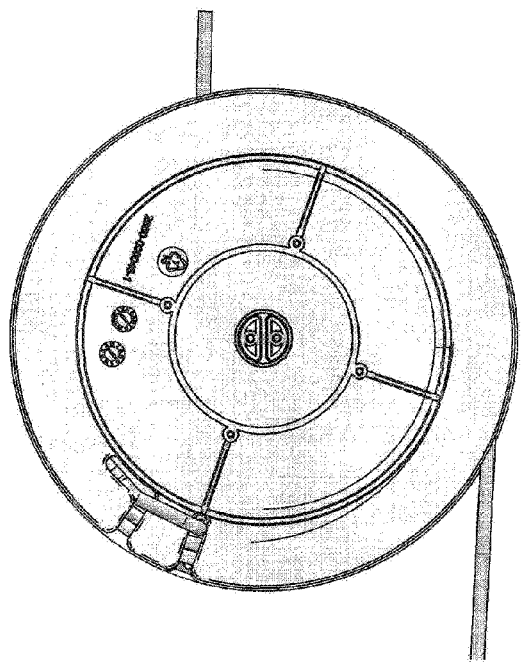
Figure 9A:
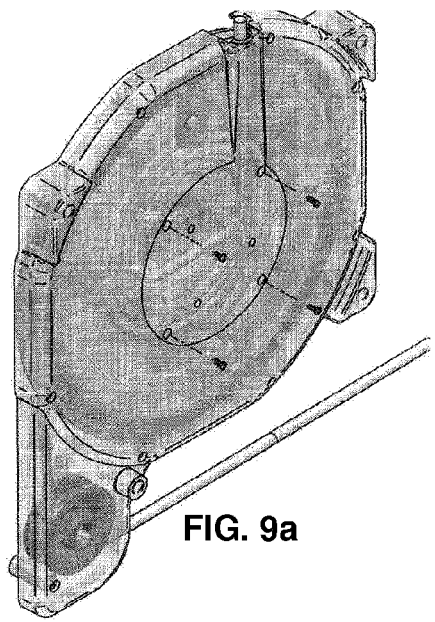
Figure 9B:
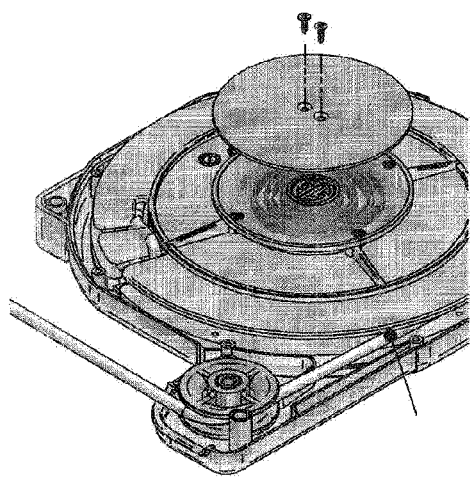
Figure 9C:
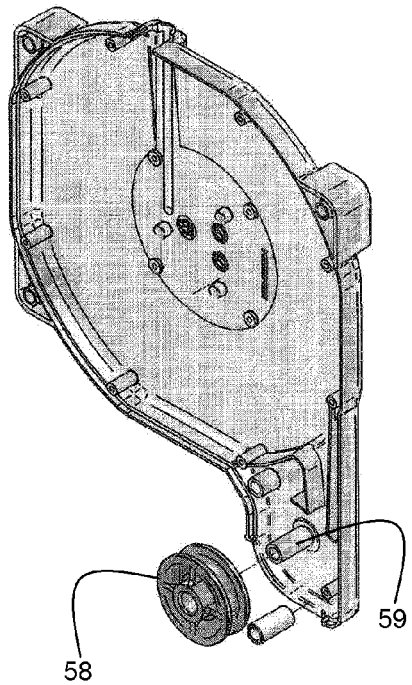
Figure 11:
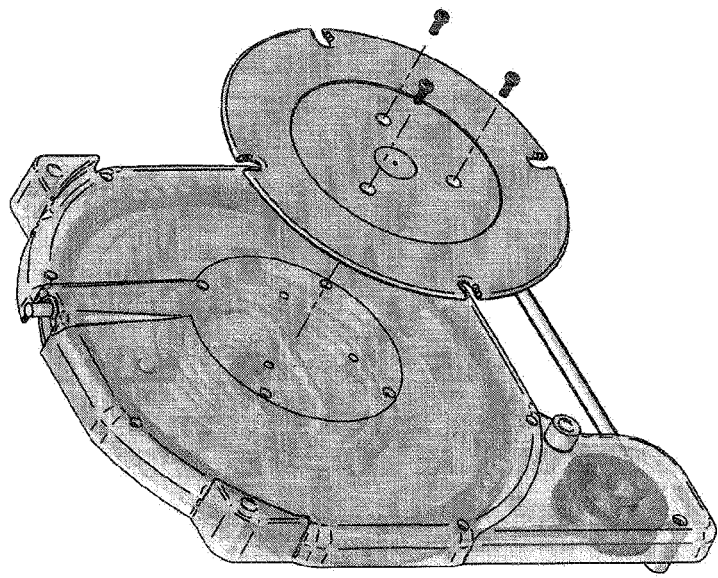
Figure 10:
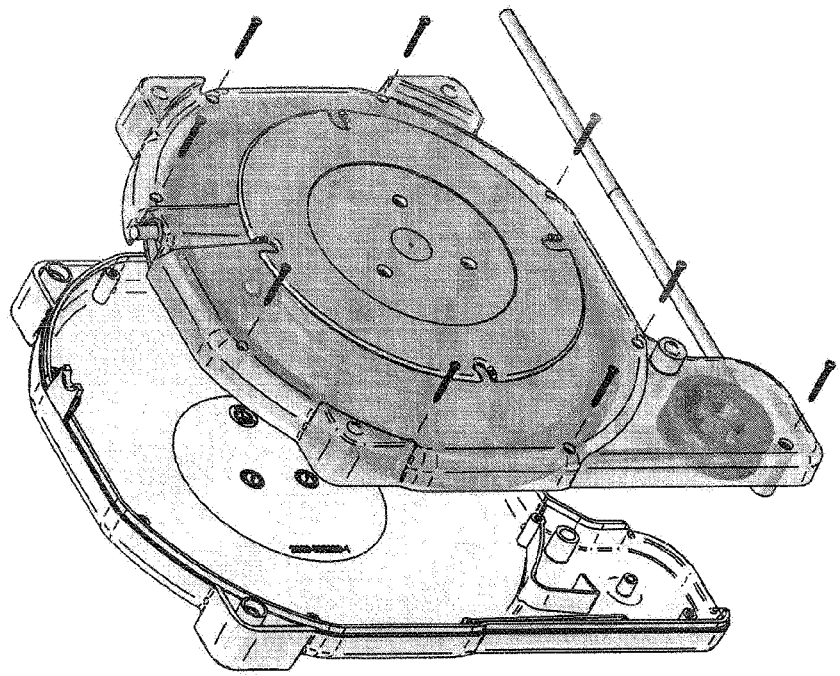
Figure 12:
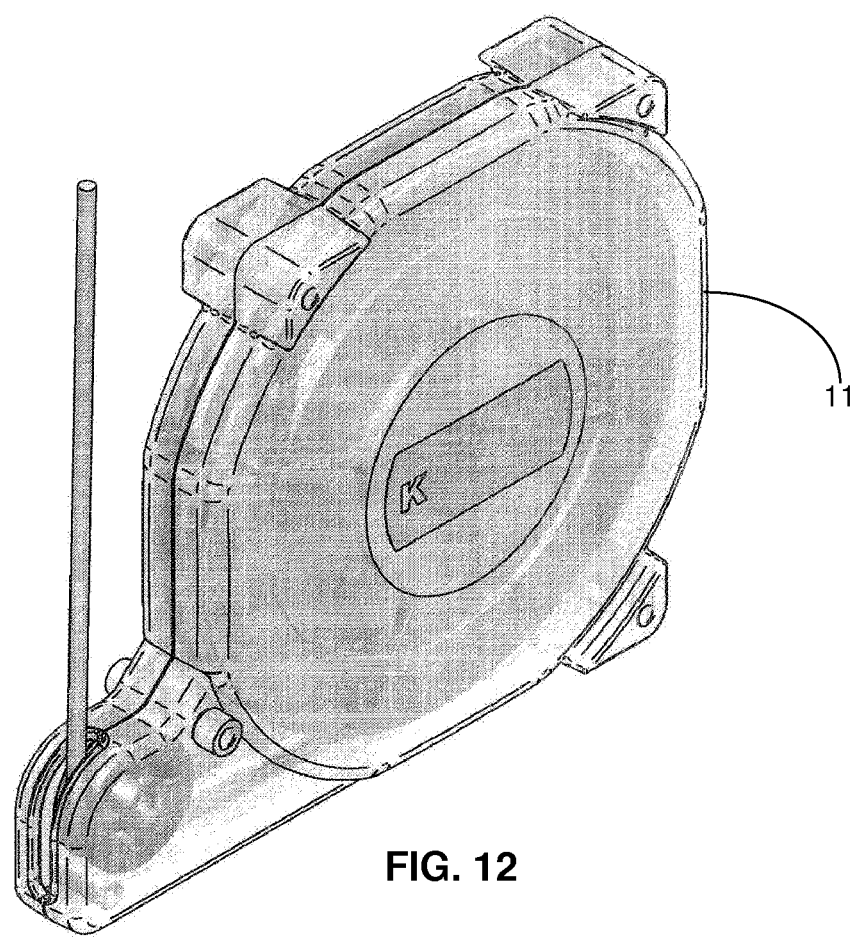

In addition to showing features of the device 10 that are not easily seen in FIG. 1, FIGS. 2a to 12 show successive stages in the assembly of the device. The assembly of the clutch 40 shown in FIGS. 2a and 2b has already been described. FIG. 2c shows assembly of the spring loaded armature 51 on the rotating spool 29. FIG. 3 shows screw attachment of the spring 55 to the armature and to rotating spool 29. FIG. 4 shows how the cable 20 is wound on the rotating spool 29 and its subsequent embedding within the radial channel 36 of the non-rotating spool shown in FIG. 5. FIG. 6 shows fixation of the annular rim 54 to the non-rotating spool 30, and FIG. 7a shows attachment of the limiter device 56 prior to assembly of the split casing as shown in FIG. 7b. FIG. 8a is a plan view of the resulting assembly showing the protruding slotted hub 31 into which the straight inner section of the coil spring is fitted as shown in FIG. 8b. FIG. 8c is an exploded view prior to assembly of the spring-loaded clutch 40. FIGS. 9a to 9c show successive stages in the routing of the first section 23 of the cable 20, whereby it passes over a freely rotating pulley 58 mounted on a spindle 59 prior to exiting from the first exit port 17. FIGS. 10, 11 and 12 shows finally assembly stages, which in themselves are not critical to an understanding of the invention but serve to show the interrelationship between various components of the device.

In use, pulling on the first end 21 of the cable 20 rotates the rotating spool 29 and unwinds the first section 23 of the cable thereby rotating the common junction 25 between the first and second sections of the cable. Since the second section 24 of the cable is wound in the opposite direction to the first section and the common junction 25 is always on the outermost periphery of the coiled second section, this rotates the outer end only of the second section in a direction that uncoils it without applying force to the opposite end of the second section. Consequently, the second end of the cable is to all intents and purposes anchored relative to the housing so that even if it is connected to a remote fixture, extending the first section induces no twisting in the second section.

It should be noted that the second section of the cable does not need be wound on a spool. If desired, it may simply be coiled inside the housing supported between a pair of discs, which in effect co-operate with the outer rim of the housing to form a kind of drum. Thus, there is no need to wind the second section on a bobbin or spool having a central core since it can be loosely coiled inside a drum fixedly mounted inside the housing. Any alternative structure is permissible whereby rotation of the rotating spool induces rotation of the junction between the first and second sections of cable, thereby winding or unwinding the peripheral end of the second section without inducing rotation of the opposite end.

Figure 13:
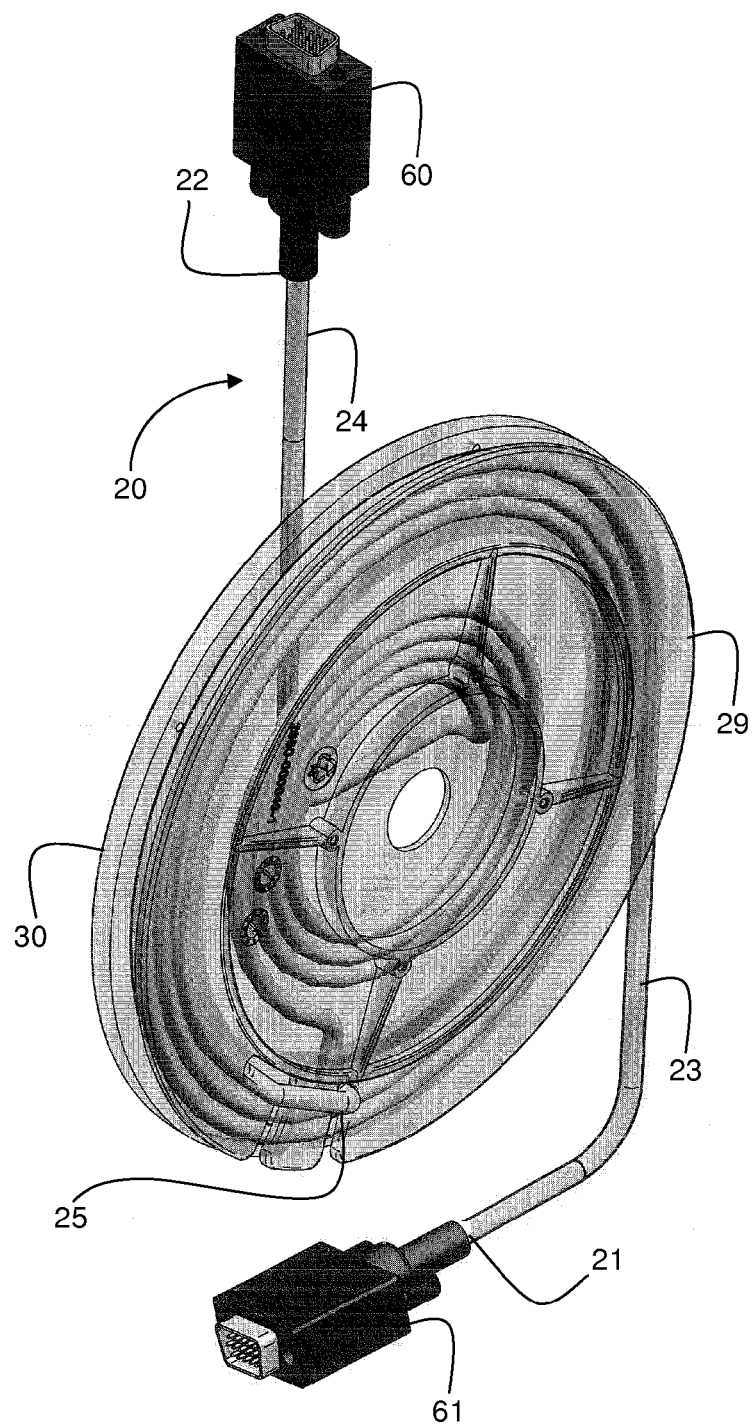
FIGS. 13 and 14 are pictorial representations showing the cable extension device with the cable in the retracted and extracted states, respectively.
Figure 14:
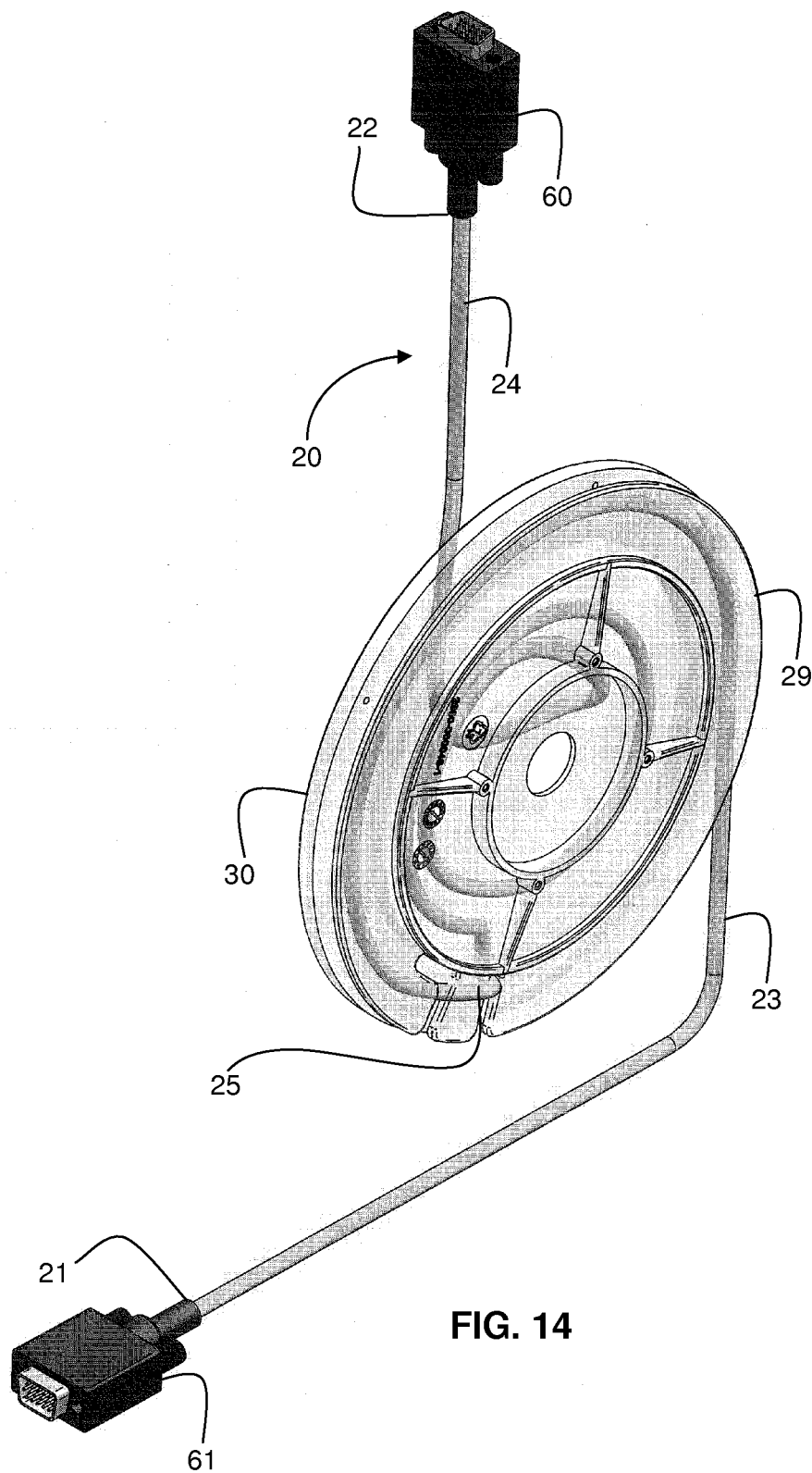

FIGS. 13 and 14 are pictorial representations showing the cable extension device with the cable in the retracted and extracted states, respectively. Also shown are plugs 60 and 61 mounted on the opposite ends 21 and 22 of the cable 20 i.e. at opposite ends of the first and second cable sections 23 and 24, respectively. It is seen that the common junction 25 of the sections 23 and 24 is fixedly anchored to the rotating spool 29 so that when the end 21 is pulled the spool 29 rotates and the first section 23 is withdrawn as shown in FIG. 14. The second section 24 is also anchored within the housing toward the second end 22. Therefore, when the rotating spool 29 rotates, only the common junction 25 of the second cable section 24 rotates while the opposite end 22 remains stationary thus uncoiling the second section 24 between the opposite ends 22 and 25 as shown in FIG. 14. The extent to which the second section 24 of the cable is able to uncoil determines the number of turns the rotating spool 29 can revolve, which determines the length of the free cable that can be extracted from the rotating spool. In practice, the length of the free cable to be extracted is dictated by design considerations based on end-user requirements. This then determines the length of cable that must be allocated to the second section 24, depending on the effective gear ratio between the rotating and non-rotating spools, which is a function of their respective diameters.

The invention claimed is:

1. A rewindable electrical cable extension device for coupling between first and second connectors, the device comprising:
a housing having first and second cable exit ports;
a cable having a first end and a second end defining opposing extremities of first and second contiguous sections of the cable;
the first end of the cable protruding through the first exit port and being configured for connection to the first connector;
the second end of the cable being fixedly mounted in association with the second exit port and being configured for connection to the second connector;
the first section of the cable being wound in a first direction on a rotating spool that is configured to rotate within the housing;
a common junction of the first and second sections of the cable being anchored to the rotating spool; and
the second section of the cable being wound in an opposite direction to the first section so that unwinding the cable by pulling on the first end extracts the first section of the cable from the housing and uncoils the second section within the housing without rotating the second end of the cable
wherein:
the second section of the cable is coiled on a non-rotating spool; and
the cable passes through a peripheral slot in the non-rotating spool which separates the first section of the cable from the second end thereof.

2. The device according to claim 1, further comprising a take-up spool mounted on an exterior surface of the housing for taking up any surplus in the second section of the cable protruding through the second exit port.

3. The device according to claim 1, wherein the rotating spool comprises:
a first surface having a radial channel for accommodating the cable therein; and
an opening abutting the radial channel for allowing the cable to be folded through the opening to a second surface of the rotating spool.

4. The device according to claim 3, wherein the rotating spool comprises a bobbin on the second surface for winding the first section of the cable thereon.

5. The device according to claim 4, wherein the bobbin comprises a circular disc coaxially mounted on a cylindrical hub.

6. The device according to claim 1, further including a spring-loaded clutch for rewinding the first section of the cable on to the rotating spool.

7. The device according to claim 6, wherein the spring-loaded clutch includes a coil spring mounted within the rotating spool, said coil spring having a first end and a second end, said first end being anchored to the rotating spool and the second end being fixedly anchored relative to the housing, the coil spring being wound so that when the rotating spool is unwound the coil spring is wound.

8. The device according to claim 7, wherein the clutch comprises a spring loaded armature pivotally mounted on the rotating spool and having a contoured outer edge for engaging a contoured inner surface of an annular rim fixed to the non-rotating spool so as to prevent rotation of the rotating spool and being responsive to tension in the first section of the cable for rotating the clutch thereby releasing the clutch from the annular rim thereby allowing rotation of the rotating spool.

9. The device according to claim 1, further including a limiter device operatively connected to the first section of the cable for limiting the extent to which the first section of the cable can be withdrawn from the housing.

10. The device according to claim 9, wherein the limiter device comprises an armature crimped to the first section of the cable proximate the common junction between the first and second sections and configured to engage an internal surface of the housing and prevent further withdrawal of the cable.

11. The device according to claim 1, wherein the peripheral slot serves to anchor the common junction between the first and second sections of the cable.

12. A rewindable electrical cable extension device for coupling between first and second connectors, the device comprising:
   a housing having first and second cable exit ports;
   a cable having a first end and a second end defining opposing extremities of first and second contiguous sections of the cable;
   the first end of the cable protruding through the first exit port and being configured for connection to the first connector;
   the second end of the cable being fixedly mounted in association with the second exit port and being configured for connection to the second connector;
   the first section of the cable being wound in a first direction on a rotating spool that is configured to rotate within the housing;
   a common junction of the first and second sections of the cable being anchored to the rotating spool; and
   the second section of the cable being wound in an opposite direction to the first section so that unwinding the cable by pulling on the first end extracts the first section of the cable from the housing and uncoils the second section within the housing without rotating the second end of the cable;
   wherein the rotating spool comprises:
      a first surface having a radial channel for accommodating the cable therein, and
      an opening abutting the radial channel for allowing the cable to be folded through the opening to a second surface of the rotating spool.

13. The device according to claim 12, wherein the second section of the cable is coiled on a non-rotating spool.

14. The device according to claim 12, wherein the second section of the cable is coiled inside a non-rotating drum.

15. The device according to claim 12, wherein the rotating spool comprises a bobbin on the second surface for winding the first section of the cable thereon.

16. The device according to claim 15, wherein the bobbin comprises a circular disc coaxially mounted on a cylindrical hub.

17. The device according to claim 12, further including a limiter device operatively connected to the first section of the cable for limiting the extent to which the first section of the cable can be withdrawn from the housing.

18. The device according to claim 17, wherein the limiter device comprises an armature crimped to the first section of the cable proximate the common junction between the first and second sections and configured to engage an internal surface of the housing and prevent further withdrawal of the cable.

19. A rewindable electrical cable extension device for coupling between first and second connectors, the device comprising:
   a housing having first and second cable exit ports;
   a cable having a first end and a second end defining opposing extremities of first and second contiguous sections of the cable;
   the first end of the cable protruding through the first exit port and being configured for connection to the first connector;
   the second end of the cable being fixedly mounted in association with the second exit port and being configured for connection to the second connector;
   the first section of the cable being wound in a first direction on a rotating spool that is configured to rotate within the housing;
   a common junction of the first and second sections of the cable being anchored to the rotating spool; and
   the second section of the cable being wound in an opposite direction to the first section so that unwinding the cable by pulling on the first end extracts the first section of the cable from the housing and uncoils the second section within the housing without rotating the second end of the cable;
   said device further including a spring-loaded clutch for rewinding the first section of the cable on to the rotating spool, wherein the spring-loaded clutch includes:
      a coil spring mounted within the rotating spool, said coil spring having a first end and a second end, said first end being anchored to the rotating spool and the second end being fixedly anchored relative to the housing, the coil spring being wound so that when the rotating spool is unwound the coil spring is wound; and
      a spring loaded armature pivotally mounted on the rotating spool and having a contoured outer edge for engaging a contoured inner surface of an annular rim fixed to the non-rotating spool so as to prevent rotation of the rotating spool and being responsive to tension in the first section of the cable for rotating the clutch thereby releasing the clutch from the annular rim thereby allowing rotation of the rotating spool.

20. The device according to claim 19, wherein the second section of the cable is coiled on a non-rotating spool.

21. The device according to claim 19, wherein the second section of the cable is coiled inside a non-rotating drum.

22. The device according to claim 19, further including a limiter device operatively connected to the first section of the cable for limiting the extent to which the first section of the cable can be withdrawn from the housing.

23. The device according to claim 22, wherein the limiter device comprises an armature crimped to the first section of the cable proximate the common junction between the first and second sections and configured to engage an internal surface of the housing and prevent further withdrawal of the cable.

24. A rewindable electrical cable extension device for coupling between first and second connectors, the device comprising:
   a housing having first and second cable exit ports;

a cable having a first end and a second end defining opposing extremities of first and second contiguous sections of the cable;

the first end of the cable protruding through the first exit port and being configured for connection to the first connector;

the second end of the cable being fixedly mounted in association with the second exit port and being configured for connection to the second connector;

the first section of the cable being wound in a first direction on a rotating spool that is configured to rotate within the housing;

a common junction of the first and second sections of the cable being anchored to the rotating spool; and the second section of the cable being wound in an opposite direction to the first section so that unwinding the cable by pulling on the first end extracts the first section of the cable from the housing and uncoils the second section within the housing without rotating the second end of the cable;

wherein:

the second section of the cable is coiled inside a non-rotating drum; and the cable passes through a peripheral slot in the non-rotating drum which separates the first section of the cable from the second end thereof.

25. The device according to claim 24, wherein the cable passes through a peripheral slot in the non-rotating drum which separates the first section of the cable from the second end thereof.

26. The device according to claim 25, wherein the peripheral slot serves to anchor the common junction between the first and second sections of the cable.

27. The device according to claim 24, wherein the peripheral slot serves to anchor the common junction between the first and second sections of the cable.

28. The device according to claim 24, further comprising a take-up spool mounted on an exterior surface of the housing for taking up any surplus in the second section of the cable protruding through the second exit port.

29. The device according to claim 24, further including a limiter device operatively connected to the first section of the cable for limiting the extent to which the first section of the cable can be withdrawn from the housing.

30. The device according to claim 29, wherein the limiter device comprises an armature crimped to the first section of the cable proximate the common junction between the first and second sections and configured to engage an internal surface of the housing and prevent further withdrawal of the cable.

* * * * *